(12) United States Patent
Stahulak et al.

(10) Patent No.: US 9,076,145 B2
(45) Date of Patent: Jul. 7, 2015

(54) SYSTEMS AND METHODS FOR PURCHASING ELECTRONIC TRANSMISSIONS

(75) Inventors: Charles Stahulak, Chicago, IL (US);
Bruce Bames, Pingree Grove, IL (US);
Mark Gribble, Sycamore, IL (US);
Dolores Mallian, St. Charles, IL (US);
Patrick Kenny, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1080 days.

(21) Appl. No.: 12/265,732

(22) Filed: Nov. 5, 2008

(65) Prior Publication Data

US 2010/0114730 A1    May 6, 2010

(51) Int. Cl.
*G06Q 30/00* (2012.01)
*G06Q 30/06* (2012.01)

(52) U.S. Cl.
CPC .......... *G06Q 30/00* (2013.01); *G06Q 30/0601* (2013.01)

(58) Field of Classification Search
CPC ...................................... G06Q 30/00
USPC ........................................... 705/26
See application file for complete search history.

(56) References Cited

U.S. PATENT DOCUMENTS

| | | | |
|---|---|---|---|
| 7,590,243 B2* | 9/2009 | Kahn et al. ............. | 380/239 |
| 2001/0051996 A1* | 12/2001 | Cooper et al. ........... | 709/217 |
| 2007/0156539 A1* | 7/2007 | Yates ...................... | 705/26 |
| 2008/0015860 A1* | 1/2008 | Lane et al. .............. | 704/258 |
| 2008/0279386 A1* | 11/2008 | Kahn et al. ............. | 380/278 |

OTHER PUBLICATIONS

"Stiletlo2 User Guide", Sirius Satellite Radio, Inc., pp. 1-54, 2007.
"XM2go Portable Satellite Radio with MP3", Pioneer, pp. 1-91, 2006.
Ferency-Viars, Robert, et al., "What you need to Know about HD Radio", http://www.crutchfield.com/learn/learningcenter/car/hdradio.html?page=3, May 6, 2008.

* cited by examiner

*Primary Examiner* — James A Reagan
(74) *Attorney, Agent, or Firm* — Parks Wood LLC

(57) ABSTRACT

Provided are methods, apparatus and systems for the sale of digital content over a network. The disclosure herein discusses the recording of a broadcast of a digital data stream by a broadcast receiving device. A listener may select a particular digital data stream to purchase by selecting a content identifier associated with the digital data stream of interest at the recording device. Upon obtaining the selection, a purchase request message is transmitted to an intermediary communication device. The purchase request message includes at least the content identifier. After the transaction is completed at a transaction server, a purchase confirmation message including at least a digital rights management key associated with the digital data stream is returned to and received by the broadcast receiving device. Upon receipt, of the digital rights management key, the recorded digital data stream is released for reproduction.

20 Claims, 7 Drawing Sheets

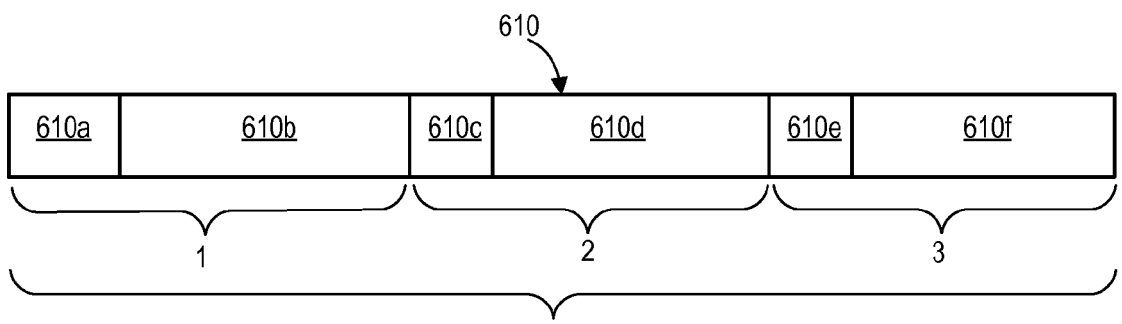
FIG. 6A - BROADCAST EVENT DIGITAL DATA STRING
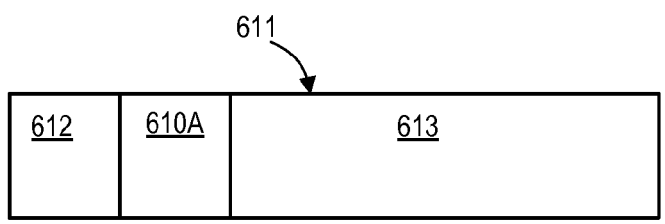
FIG. 6B - PURCHASE REQUEST MESSAGE
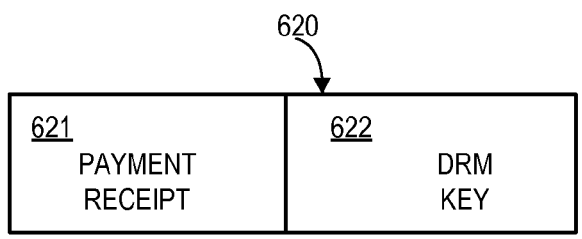
FIG. 6C - PURCHASE ACKNOWLEDGMENT MESSAGE

SYSTEMS AND METHODS FOR PURCHASING ELECTRONIC TRANSMISSIONS

TECHNICAL FIELD

Embodiments herein are related to mobile communication devices. More particularly, embodiments described herein relate to systems and methods allowing a user of a radio or television receiver to make a purchase directly from their digital radio or television receiver.

BACKGROUND

Typically, recordings of first run songs, sports events, news stories and commentary are not easily available to the average listener unless the listener is able to manually record the broadcast on the spot. This is so because the owner of the broadcast content desires to control the distribution of their content in order to maximize revenues and return on the investment required to produce the content. As such, a potential consumer must take positive steps requiring effort to acquire copies of any desired content.

SUMMARY

Provided are exemplary embodiments. The embodiments provide a method for purchasing digital content on demand over a network. At a broadcast receiving device, at least a portion of a broadcast of a digital data stream may be recorded. To purchase the Digital Management Rights to the digital data stream, a content identifier associated with the digital data stream may be selected. When selected, a purchase request message may be transmitted to an intermediary communications device. The purchase request message may include the content identifier and purchase information. The broadcast receiving device may receive a purchase confirmation message that includes at least a digital rights management key which is associated with the digital data stream. Upon receipt, the digital rights management key may release the recorded digital data stream for reproduction.

Exemplary embodiments also include a method for purchasing digital content on demand over a network by storing purchase information within a cellular communication device. The cellular communication device may receive a purchase request message from a second communication device that may include at least a user identifier and a content identifier associated with a digital data stream that was received via a broadcast by the second communication device. The cellular communication device may query a database for purchase information associated with the user identification. The cellular communication device may then integrate the purchase request message to include the purchase information and transmit the recompiled purchase request message to a transaction server.

In accordance with other exemplary embodiments, an apparatus is provided comprising a broadcast transceiver capable of receiving a broadcast of a digital data stream that may include a content identifier. A wireless transceiver may transmit a purchase request message to an intermediary communication device, the purchase request message may include the content identifier and the purchase information. The apparatus may include a memory module that records the digital data stream, the content identifier and the purchase information. The apparatus may also include a transducer such that when the transducer is manipulated the content identifier associated with the digital data stream is selected from the memory module and a purchase request message is generated and transmitted to an intermediary communication device. When a purchase confirmation message is received, from the intermediary communication device that includes a digital rights key associated with the digital data stream, the recorded digital data stream is released for reproduction.

Other apparatuses, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

BRIEF DESCRIPTION OF THE DRAWINGS

FIG. 6a is an abstract diagram of an exemplary broadcast event data stream.

FIG. 6b is an abstract diagram of an exemplary Purchase Request Message.

FIG. 6c is an abstract diagram of an exemplary Purchase Acknowledgment Message.

DETAILED DESCRIPTION

Figure 1:
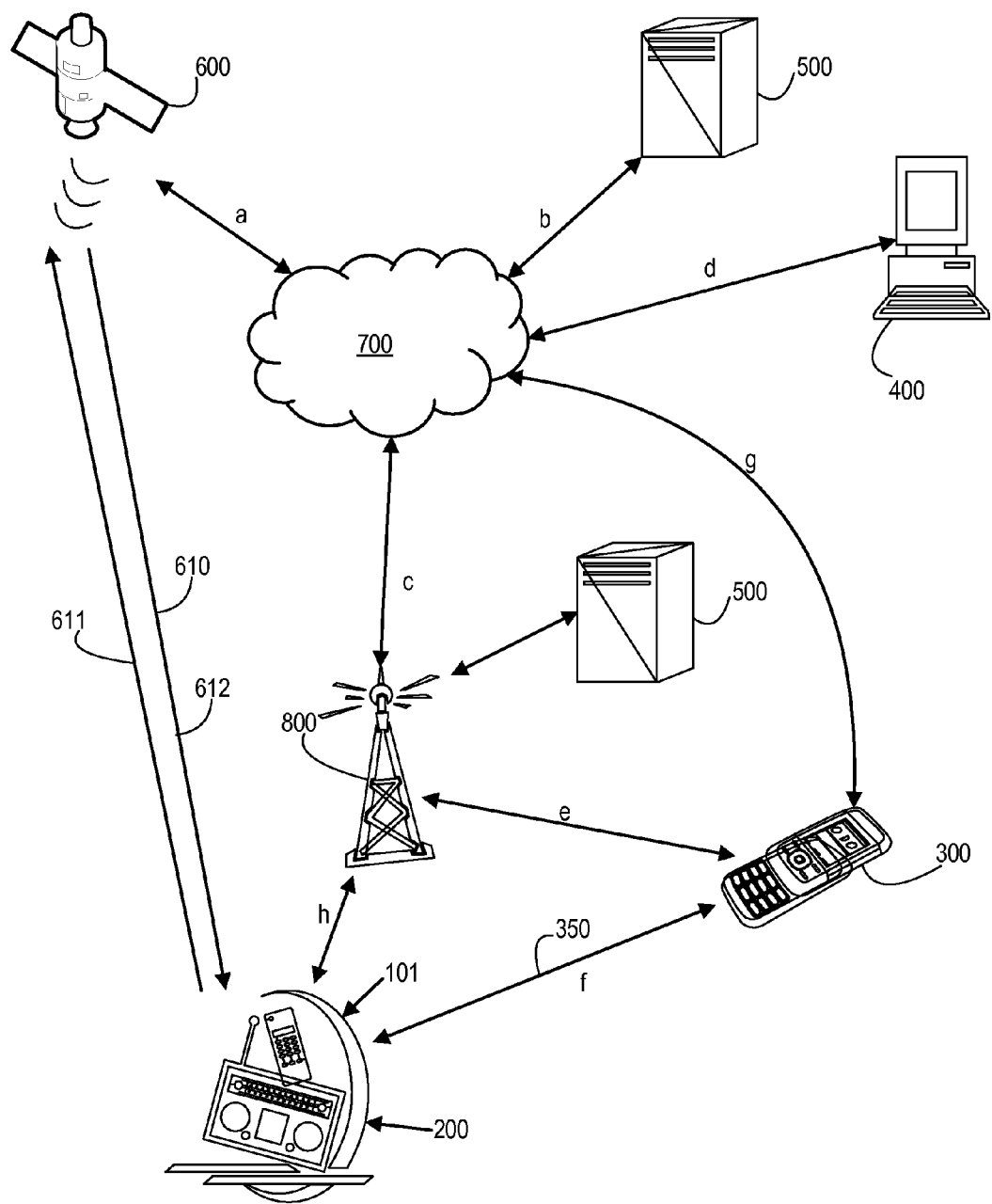
FIG. 1 is a summary diagram illustrating an exemplary system for provisioning and utilizing a wireless communication device.

The following disclosure is directed to apparatus, methods and systems allowing a user of a broadcast receiving device to purchase or otherwise acquire a license or other form of digital management right ("DMR") to a digital transmission from an owner of the copyright to the digital transmission in real time. The broadcast receiving device may be any device that can receive a digital broadcast. Non-limiting examples of a broadcast receiving device include, but are not limited to, a digital radio, a digital television, a computer, a cell phone, an MP3 player and a computing device.

The license being acquired may attach to any form of the digital transmission (hereinafter, a "digital data stream") of the copyrighted subject matter including any specific forms or protocols as may be set forth in the common law or the copyright statutes as amended. It is contemplated that the embodiments disclosed herein may also be adapted for use in acquiring digital data streams that reside in the public domain which are not protected by the copyright statutes. Digital data streams include but are not limited to music, movies, sporting events, television shows, commercials, news, and/or commentary. Digital data streams may include any subject matter broadcast over satellite systems, over-the-air via radio frequency (RF) systems or via a wireline/optical data network.

It is contemplated herein that each particular digital data stream may be assigned a unique content identifier (i.e. a digital tag) in a manner as may be known to those of ordinary skill in the art. To the extent that a particular broadcast event may contain multiple parts (e.g. a concert, a play or a football game), each segment of the event (e.g. an act, a song or a play from scrimmage) may have its own content identifier such that each particular segment of the event may be identified as well as the entire event. In the case of a live broadcast, the content identifier may be assigned in real time as the broadcast event progresses and is transmitted. Each content identifier may contain Internet Protocol (IP) address information for a transaction server 500 (See FIG. 1) where the digital rights for the digital data stream may be acquired.

In embodiments that may involve digital television, content identifiers may be associated with the program, or parts of a program being received. Content identifiers may also be associated with particular objects rendered on the viewing screen such that a viewer may use an ancillary device such as a pointing device (i.e. a device 101) to indicate and select a particular object. The object may then be purchased using the methods further disclosed herein. Similarly, the viewer may also be able to obtain information about the object or the person indicated. It should be noted that the ancillary device 101 of FIG. 1 may represent any type of personal electronic device in order to simplify the drawings. Non-limiting examples of devices may include cell phones, electronic pointers, MP3 players, remote controls, digital sound recorders, portable memory devices, etc.

FIG. 1 presents an overview of the various embodiments disclosed herein. For the sake of clarity and not to be considered limiting in any way, FIG. 1 is addressed to a satellite broadcast system (SBS) example. Other non-limiting types of broadcasts may include internet broadcasts, radio (RF) broadcasts, television broadcasts and the like.

In this non-limiting example, a broadcast event 610 (See FIG. 6*a*) may be broadcast to a digital radio 200 via a satellite broadcast system 600. As a further non-limiting example, a concert may be the broadcast event. While listening to the concert, a user may hear a new song (610*b*, 610*d* or 610*f*) that they find to be particularly appealing. The user may want to purchase the song 610*b*, 610*d*, or 610*f* immediately or at a later time. Each component of FIG. 1 will be discussed in more detail below.

In an embodiment, the user may initiate the purchase from the digital radio 200 by causing the digital radio to transmit a purchase request message 611 (See, FIG. 6B) to the transaction server 500 via the SBS 600 and a network 700. The server 500 may be any type of computing device technically capable of receiving a message, completing a transaction and returning a response message as may fit the needs of a system designer. A purchase acknowledgment message 620 (See, FIG. 6*c*) may be returned in real time to the digital radio 200, or it may be delayed. The purchase acknowledgement message 620 may be returned via the same broadcast path or via another route through the network 700.

In another embodiment, the user may initiate the purchase by causing the digital radio 200 to transmit the purchase request message 611 to the transaction server 500 via a cellular network 800. The cellular network 800 may then forward the purchase request message 611 to the transaction server 500 via the network 700. The purchase acknowledgement message 620 may then be returned in real time or it may be delayed. The purchase response message may 620 be returned via the same path by which it was received or via another route through the network 700 and/or cellular system 800. The purchase response message may comprise the digital data stream 610 and may be deliverable to an address other than the digital radio 200.

As a general point, it would be recognized by one of ordinary skill in the art that digital data stream 610, purchase request message 611 and purchase acknowledgement message 620 may travel via each segment (a-h) of the combined networks as may be found advantageous by a system designer. References to the multitude of embodiments disclosing the combinations and permutations of message traffic routing have been omitted for clarity.

In other embodiments, the user may initiate the purchase by causing the digital radio 200 to transmit the purchase request message 611 to the transaction server 500 via a cellular telephone 300 and the cellular network 800. Alternatively, the digital radio 200 may transmit the purchase request message 611 wirelessly to the cell phone 300 via a short range RF protocol or via infrared signaling. The cellular telephone 300 may then automatically contact the transaction server 500 via the cellular system 800 (e.g. cellular dial up) and/or the network 700 (e.g. via WiFi). The purchase acknowledgement message 620 from the transaction server 500 may be returned in real time or it may be delayed. The purchase acknowledgement message 620 may be returned via the same path by which it was received by the transaction server 500 or via another route through the network 700/800. The purchase response message may comprise the digital data stream 610 and may be deliverable to an address other than the digital radio 200.

The cellular system 800 may utilize any cellular protocol. Non-limiting examples include Time Division Multiple Access (TDMA), Code Division Multiple Access (CDMA), Frequency Division Multiple Access (FDMA) or Global System for Mobile (GSM) technologies. To the extent that the transaction server 500 may have cellular capabilities, the cellular system 800 may bypass the network 700 and communicate the purchase request message 611 directly to the transaction server 500.

The purchase request message 611 (FIG. 6B) may include a content identifier 610*a* that is associated with the digital data stream 610*b* and may also include a user ID 612. The content identifier 610*a* may be generated by any method that is desired by a system designer. The user ID 612 may uniquely identify the user and/or the digital radio 200 attempting to make the purchase to the transaction server 500 and may comprise any digital string format that may be desired by one of ordinary skill in the art.

The purchase request message 611 may also include purchase information 613 (FIG. 6B) that allows a transaction for value to take place at the transaction server 500. As non-limiting examples, such purchase information 613 may include credit card information, information authorizing the debiting of an account and/or an IP address/telephone number of the transaction server 500. Non-limiting examples of debit accounts include a prepaid cash account and a non-cash account not unlike a frequent flyer account. It should be noted that a user may have multiple, discrete sets of purchase information stored in various computing devices accessible via the cell system 800 and/or the network 700. Each discrete set of purchase information may be sufficient to complete a transaction (e.g. multiple credit cards, debit cards, checking accounts and/or lines of credit).

In embodiments, an intermediary communication device 400 may contain the purchase information 613. The intermediary communication device 400 may receive the purchase request message 611, integrate the purchase information 613 and forward the integrated purchase request message to the transaction server 500. The intermediary communication device 400 may be any network device. Non-limiting examples of the intermediary communication device 400 may be a network base station associated with the cellular network 800, the cell phone 300, the network server 400 RF transceiver 350, and the satellite system 600. Alternatively, the purchase information may reside in the digital radio 200.

Regardless of the transmission path, the purchase request message 611 may be forwarded to the transaction server 500. At the transaction server 500, the purchase of the license and/or any other digital rights may take place in any fashion as may be known to those of ordinary skill in the art.

To the extent that the digital radio 200 does not contain the purchase information 613, a query message (not shown) containing the user ID 612 may be sent via the cellular system 800 and/or network 700 to the network data server 400 or to the cellular communication device 300 that may contain the purchase information 613. The purchase information 613 may be returned to the digital radio 200 for inclusion into the purchase request message 611.

As a non-limiting example, the user's cell phone 300 may contain the necessary purchase information 613 (FIG. 6B). Such information may be accessed by sending a query message (not shown) to the user's cell phone 300 via a short range wireless network 350. The cell phone 300 may communicate directly with the digital radio 200 via a radio frequency protocol and may return the purchase information 613 for inclusion into the purchase request message 611 by the digital radio. Non-limiting examples of such radio frequency protocols include Bluetooth (IEEE 802.15.3), WiFi and Zigbee (IEEE 802.15.4). The digital radio 200 and the user's cell phone 300 may also communicate using the infrared or visible light spectrum and by wire connection.

Alternatively, the digital radio 200 may transmit the purchase request message 611 to the user's cell phone 300 where the purchase information 613 may be appended to the purchase request message 611. The user's cell phone 300 may then automatically forward the purchase request message 613 to the transaction server 500 via the cell system 800 and/or the network 700.

The network 700 may be any type of communication network or combination of networks that may exist to facilitate communications between components disclosed herein. Non-limiting examples of the network 700 may include an IP data network, a public switched telephone network, a packet switched network, a cellular network or a Personal Communication Service (PCS) in either of its analog and digital versions. The telecommunications network 700 may also be a satellite communication system or employ multiple connected instances of short-range communications such as WiFi and/or long range communications such as WiMax and still fall within the scope of this disclosure.

Upon completion of the transaction, the transaction server 500 may send the acknowledgment message 620 to the user's digital radio 200 via the SBS 600 and network 700. The acknowledgement message 620 may include a payment receipt 621.

Alternatively, the acknowledgement message 620 may also be sent to any other personal communication device and/or account as directed by the user via any other combination of the networks 700/800/600. As a non-limiting example, the acknowledgment message 620 may be sent to the user's cell phone 300 via a base station of the cellular network 800.

In addition to the payment receipt 621, the acknowledgement message 620 may also contain a DMR key 622 as may be known in the art that may enable the digital radio 200 to replicate or to transfer the song from the digital radio 200 to another computing device such as an MP3 player 101. Although the digital radio 200 may have recorded the song before the purchase or may be recording the song during the purchase, the digital radio may be unable to transfer the song to another computing device 100 or a computer readable medium due to DMR restrictions. The receipt of the DMR key 622 along with the acknowledgement message 620 may release the song for transfer within the scope of whatever digital rights have been purchased through the transaction server 500.

In other embodiments the acknowledgement message 620 may be integrated with, or may be accompanied by, the purchased digital data string 610. The digital data string may be in the form of a data string, a MP3 file, a Wav file or any other type of sound file format as may be useful. The sound file may be associated with the acknowledgement 620 message and/or payment receipt as an attachment. As a non-limiting example the acknowledgement message may comprise an e-mail message with a MP3 attachment. The e-mail message may include a manually readable purchase receipt 621 while the attached MP3 file comprises the data string and any DMR associated with the MP3 file.

Upon release, the digital radio 200 may transfer the digital data stream 610 to another computing device 101 directly or may transfer the digital data stream via a local network, such as the network 350, as may be known in the art. Non-limiting examples of means for transferring the digital data stream 610 may include infrared transmission, visible light transmission, RF transmission (e.g. Zigbee, Bluetooth Wi-Fi or WiMax protocols), sound transmission, and a hot synchronization via a wired connection 260 (FIG. 2).

Figure 2:
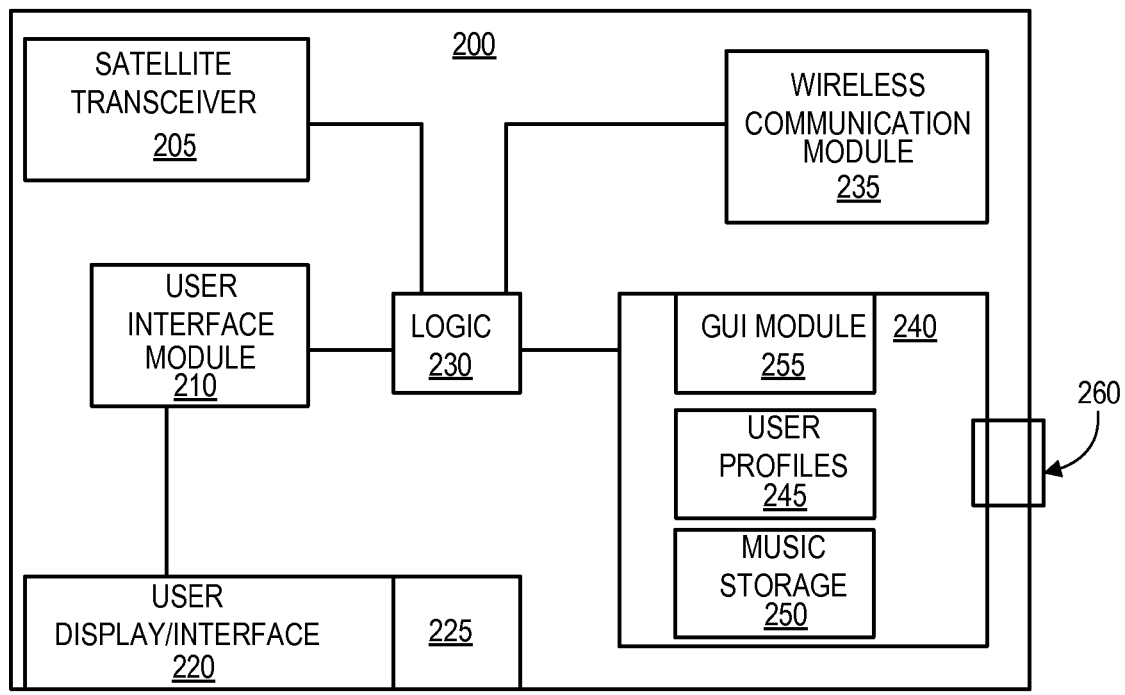
FIG. 2 is an abstract diagram of an exemplary broadcast receiving device consistent with the disclosure herein.

FIG. 2 is a simplified block diagram of the broadcast receiving device 200. As discussed above the broadcast receiving device 200 may be any type of device configured for receiving the digital data stream via a broadcast. In this non-limiting example the broadcast receiving device is a digital radio such as the INNO® brand digital radio marketed by Pioneer Electronics (USA), Inc. and may be modified or designed according to the disclosure herein.

The digital radio 200 may have a satellite transceiver 205 for sending purchase requests via the same satellite system that is broadcasting the concert. As such the digital radio 200 may be capable of sending as well as receiving satellite signals from the SBS 600.

The digital radio 200 may also comprise a wireless communication module 235. The wireless communication module 235 may comprise a transceiver designed for operation with any number of wireless systems and protocols. The wireless communication module 235 may also comprise multiple transceivers to communicate locally with multiple wireless devices such as the user cell phone 300, cellular system 800 or user device 101. As further non-limiting examples, the wireless communication module 235 may include a cellular transceiver, a RF transceiver, an infrared transceiver or an optical transceiver or comprise a combination thereof.

The wireless communication module 235 may communicate via a radio format standard. Non-limiting examples of such formats may include Bluetooth®, Ultra-Wideband (UWB), Wireless USB (WUSB), Zigbee, Wi-Fi, WiMAX, WiBro, near-field magnetics and HiperLAN standards. The wireless communication module 235 may also communicate optically using the infrared, ultraviolet, or other spectrum. The wireless communication module 235 may also communicate via sound transmission. Further, there may be multiple transceivers within the wireless communication module 235 which may communicate via different media including optically, audibly or by radio transmission individually or in combination.

In other embodiments, the digital radio 200 may comprise a memory module 240. The memory module 240 may comprise any type of memory storage device or any type of computer readable media. A computer readable medium may be any type of memory device or be comprised of any number or types of memory devices that conform to a manufacturer's requirements. Computer readable media may include various temporary and/or permanent storage media. Non-limiting examples of computer readable media may include any type or combination of flash memory, magnetic disks, optical disks, random access memory, EROMS, EEPROMS, field programmable gate arrays and memory sticks. Computer readable media may also include communications media, such as wired and wireless connections used to transfer the instructions or send and receive other data messages.

Within various embodiments, the memory module 240 may further include a graphical user interface (GUI) module 255, a data storage module 250 and/or a user profile module 245. The GUI module 255 may store various files, data structures and instructions that when executed and/or retrieved by the logic 230 may present a GUI to a user of the digital radio 200. The data and instructions from the GUI module 255 may be utilized by a user interface module 210 to compile and render a GUI to the user via a user display/interface 220. The GUI may provide a means of communication between the digital radio 200 and the user, allowing the user to control the functions of the digital radio 200. Non-limiting examples of user controlled functions may include creating a user profile, editing a user profile, selecting a content identifier for purchase or playback, initiating a purchase, displaying a purchase acknowledgement, such as the purchase acknowledgement 620, and downloading the digital data stream 610 to another personal computing device 101.

The user display/interface 220 may include one or more transducers 225. The transducer 225 may be any mechanical or electronic object that may be manipulated by the user. Non-limiting examples of the transducer 225 may include a mechanical button or switch located on the digital radio 200. The transducer 225 may also be an electronic/graphical button rendered on the user display/interface 220.

Regardless of the actual design choice of how the transducer 225 would be implemented, the transducer would initiate the execution of instructions recorded on a computer readable medium 210/230/240 within the digital radio 200 that would compile and transmit the purchase request message 611. Given that a desired digital data stream, such as the data stream 610, has been identified for acquisition by the user, a processor 230 may retrieve the selected content identifier 610a and the user ID 612 from the memory 240 and the user's purchase data 613 from their recorded profile 245, if any. The processor 230 may then cause the wireless communication module 235 to transmit the purchase request message 611 (FIG. 6B) to the transaction server 500 which may be identified by the content identifier 610a (FIG. 6A).

In another embodiment, the user's purchase data may alternatively include a delivery address other than the digital radio 200 to which the digital data string 610 may be delivered. As an non-limiting example, if a user wishes to have the desired music downloaded to his personal computer at his home, the user may select the address to be included in his purchase information 613. As such the transaction server may then deliver the digital data string to his computer (e.g. via e-mail) and deliver at least a copy of the purchase acknowledgement message to the digital radio 200.

The processor 230 may be any type of processor or logic. The processor 230 may include a central processing unit, an embedded processor, a dedicated/specialized processor (e.g. a digital signal processor), a field programmable gate array or a general purpose processor or some combination thereof. The processor 230 may be any other electronic element responsible for interpretation and execution of instructions, performance of calculations and/or execution of voice recognition protocols. Further the processor 230 may communicate with, control and/or work in concert with, other functional components. Without limitation, such components may include, the satellite transceiver 205, the wireless communication module transceiver 235, the user interface module 210, the memory module 240 and its component parts, the user display 220 and the transducer 225.

If the purchase information 613 was not available within the memory module 240, the purchase request message 611 may be compiled without the purchase information and then sent to the network server 400 or cell phone 300 that may be known to contain the purchase information. In an alternative embodiment, the processor 230 may send a query message to the network device 400 or the cellular telephone phone 300 for the purchase information.

The memory module 240 may also communicate with other computing devices 101 via a physical data port, such as the data port 260. The data port 260 may be used to electronically connect the memory module 240 to another device allowing digital data streams to the transmitted back and forth between the digital radio 200 and the other computing device 101. Methods to communicate between devices over a wire connection are well known in the art.

Figure 3:
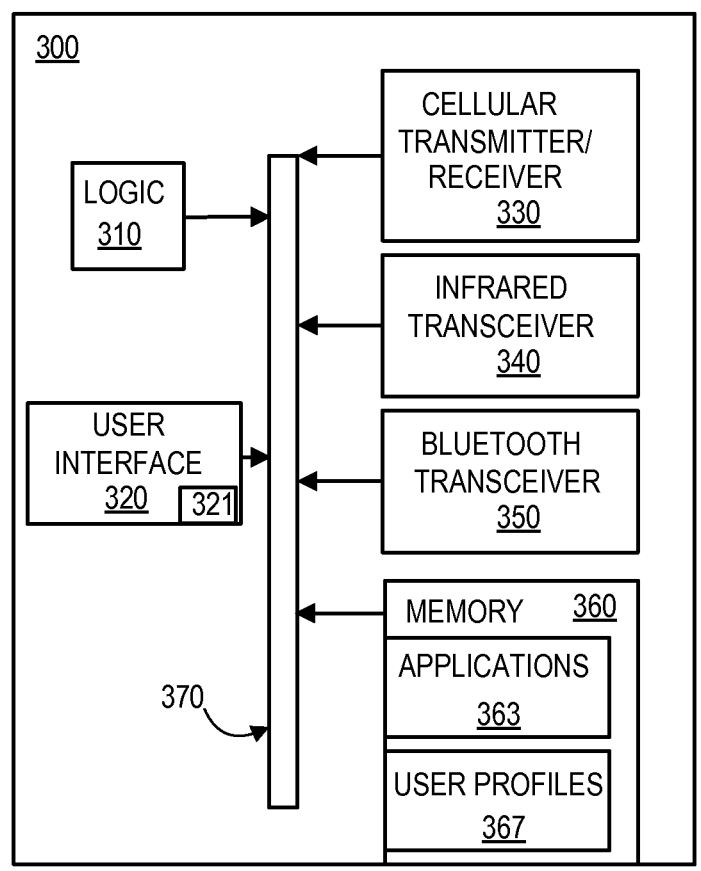
FIG. 3 is an abstract diagram of an exemplary cellular communication device consistent with the disclosure herein.

FIG. 3 is a simplified block diagram of the cellular telephone 300 that may be used to facilitate the purchase of digital management rights as further described herein. However, typical cellular telephone components that are not germane to the disclosure herein will not be discussed in the interest of clarity and brevity.

The cellular telephone 300 may comprise a logic processor 310, a user interface 320, a cellular transceiver 330, an infrared transceiver 340, a short range RF transceiver 350 and a computer readable medium such as a memory module 360. The memory module 360 may store cell phone applications 363 and other data. As a non-limiting example, the data may include a user profile 367 containing the user ID 612 that may also be unique to the user of the cell phone 300.

The memory module 360 may also have recorded upon it the purchase information 613. The purchase information 613 stored in the user profile 367 may be the same as the purchase information 613 that may be stored in the digital radio 200, or in the network server 400. Alternatively, the purchase information 613 within the memory module 360 may be different purchase information than that resident in the digital radio 200 or the network server 400.

The processor 310 may comprise a single processor or multiple processors working in combination and may be any type of processor that may fit the requirements of a system designer. The processor 310 may be in communication with the user interface 320, the cellular transceiver 330, the memory module 320, the infrared transceiver 340 and the short range RF transceiver 350 via a bus 370 and may coordinate the functions thereof.

The RF transceiver 350 may communicate via a short range radio format standard. Non-limiting examples of such formats may include Bluetooth®, Ultra-Wideband (UWB), Wireless USB (WUSB), Zigbee, Wi-Fi, WiMAX, WiBro, infrared, near-field magnetics and HiperLAN standards. The RF transceiver 350 may also communicate via sound transmission. Further, there may be multiple local transceivers within RF transceiver 350 which may communicate via different media including optically, audibly or by radio transmission individually or in combination.

The cellular telephone 300 may include the infrared transceiver 340. The infrared transceiver 340 may allow the cellular telephone 300 to directly communicate with the digital radio 200. Such communication may include the purchase request message 611, a query for the purchase information 613 or other information. Other information communicated from the digital radio 200 may include the content identifier(s) 610*a* and a user recognizable name(s) for the digital data stream(s) 610. In other embodiments, the transceiver 340 may communicate optically using the ultraviolet, or other spectrum.

The cellular telephone 300 may include a short range RF transceiver, such as the RF transceiver 350 that may operate with any of the short range RF protocols. The RF transceiver 350 may allow the telephone 300 to directly communicate with the digital radio 200. Such communication may include the purchase request message 611, a query for the purchase information 613 or other information. Other information communicated from the digital radio 200 may include the content identifier(s) 610*a* and a user recognizable name(s) for the digital data stream(s) 610(*a*).

The cellular telephone 300 may also comprise the application(s) 363. The application(s) 363, when executed, may present a means for controlling the digital radio 200 via the cellular telephone 300. The application(s) 363 may configure the user interface 320 (i.e. the keypad) of the cellular telephone 300 to enable a particular button on the user interface to become the transducer 225. The application(s) 363, when executed, may render a selectable list of those digital data streams 610 on a visual display (not shown) that have been or are being recorded on the memory 240 of the digital radio 200. The application(s) 363 may also render an electronic transducer 321 for controlling RF transceiver 350 within the visual display (not shown) of the user interface 320 such that that when manipulated within range of the digital radio 200 transmits the instructions within the digital radio 200 to purchase a selected digital data stream (e.g. 610*b*).

In an embodiment, the digital radio 200 may communicate the purchase request message 611 to the cellular telephone 300 via the wireless communication module 235 of the digital radio and the infrared or RF transceivers 350/340 of the cellular telephone. The cellular telephone 300 may in turn autodial a telephone number embedded in the content identifier 610*a* that will place the cellular telephone in communication with the transaction server 500 via the cellular system 800 and/or the network 700. The purchase request message 611 may then be transmitted to the transaction server 500. The purchase acknowledgement message 620 may be returned to the digital radio 200 along the same path in reverse or along another path as may be.

Similarly, in other embodiments, the digital radio 200 may communicate a query message to the cellular telephone 300 via the wireless communication module 235 of the digital radio and the infrared or RF transceivers 350/340 of the cellular telephone. The query message may request the purchase information 613. The cellular telephone 300 may in turn autodial a telephone number embedded in the query or, alternatively, dial a pre-stored telephone number that will place the cellular telephone in communication with the transaction server 500 or another network server via the cellular system 800 and/or the network 700. The query may then be transmitted to the transaction server 500 or another network server 400. A return message may be received by the digital radio 200 along the same path in reverse or along another path as may be efficient. The return message may provide the requested purchase information 613 to be included with a subsequent transmission of a purchase request message 611.

Figure 4:
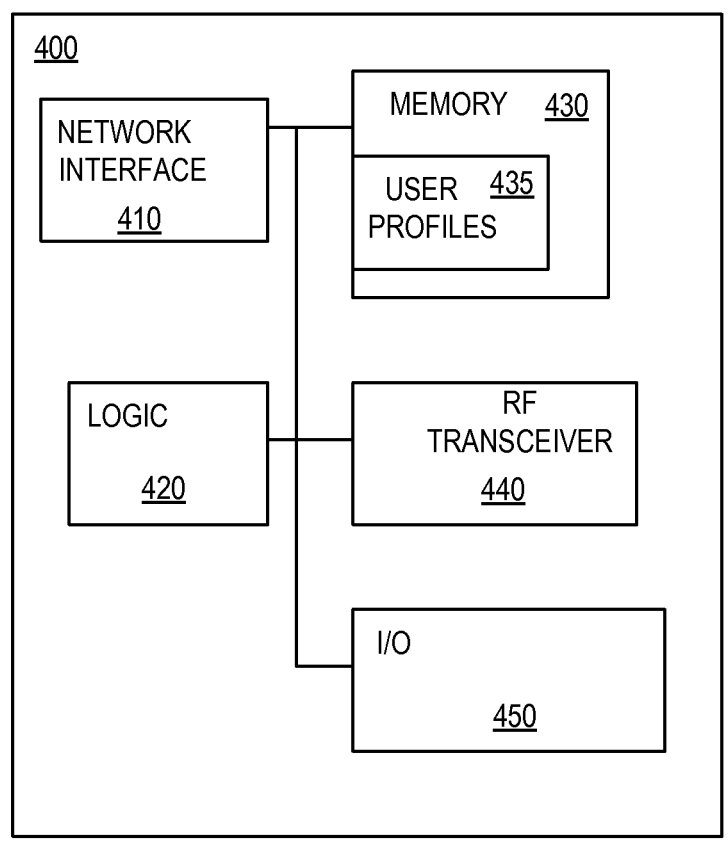
FIG. 4 is an abstract diagram of an exemplary network server.

FIG. 4 is a simplified rendition of an exemplary network server, such as the network server 400. The network server 400 may communicate with the network 700 via a network interface 410. A memory 430 may include operating instructions executed by a processor 420 and data. The data may include user profiles 435 that further include the user ID 612 and the user's purchase information 613. The user profiles 435 may be created and modified either remotely via the network interface 410 or directly via a local I/O interface 450. The I/O interface 450 may be any interface. Non-limiting examples may include a keyboard, a USB port and/or a microphone for verbal input. A voice recognition application may reside in the memory 430 as an application. The network server 400 may also include an RF transceiver 440 for wirelessly sending and receiving data via the network interface 410.

Figure 5:
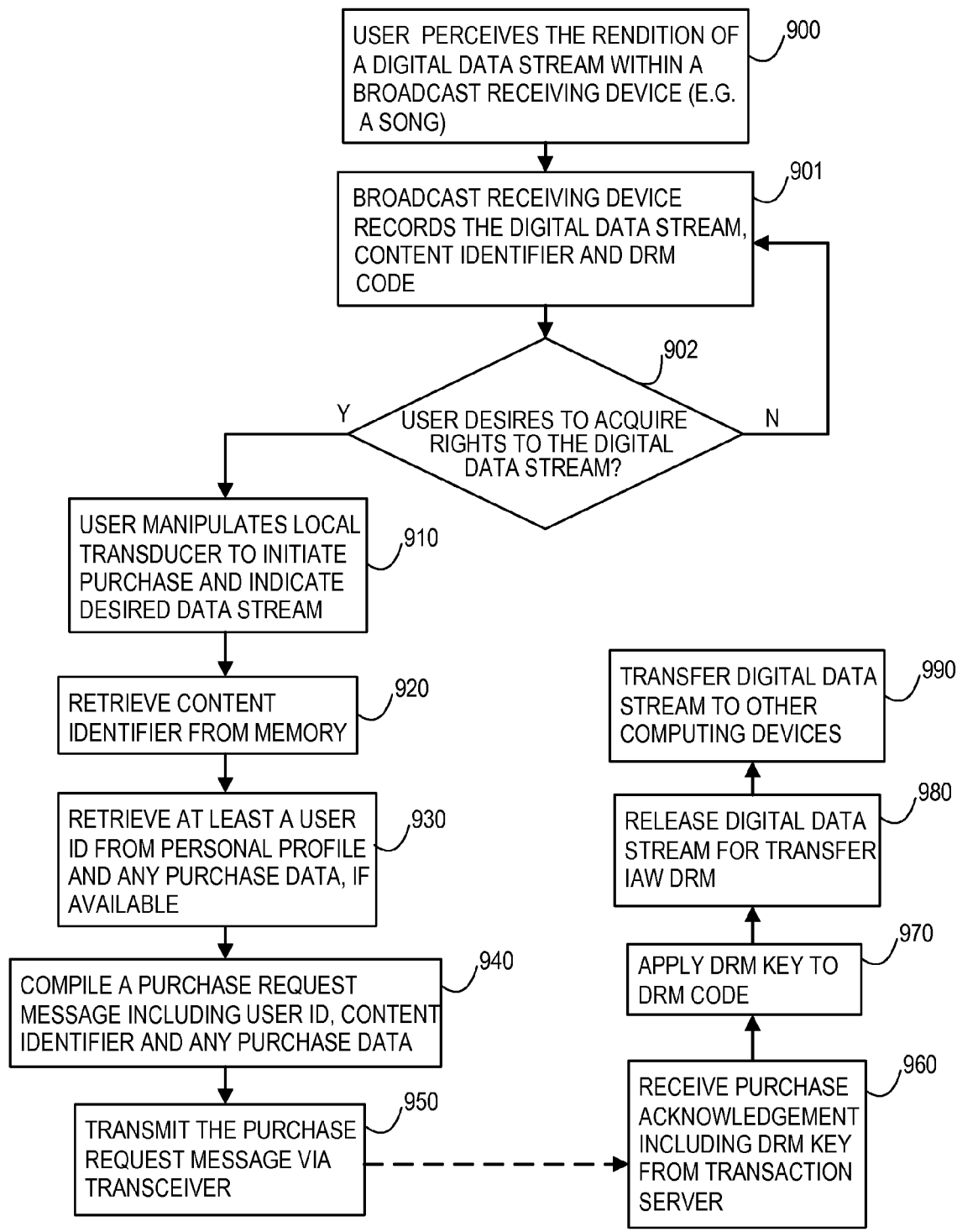
FIG. 5 is an exemplary flow diagram depicting the processes performed within an exemplary broadcast receiving device.

FIG. 5 is an exemplary flow diagram for a method to purchase the copyrights to the digital data stream 610*b* being or having been broadcast to a broadcast reception device, such as the digital radio 200. The method begins at process 900 when a user perceives the rendition of a digital data stream, such as the data stream 610*b* (e.g. a song), by a broadcast receiving device, such as the digital radio 200. At process 901 the broadcast receiving device 200 records the digital data stream 610*b*. The broadcast may be a concert. As a non-limiting example the concert may be identified by the content identifier 610*a* integrated within the digital data stream 610 that was actually broadcast, received, indexed and stored within the data storage module 250.

A user (e.g. a listener) may decide that they wish to purchase a copy of a particular broadcast digital data stream 610*b* of interest, either by hearing it or by viewing an index display at decision point 902. The user may review an index of what is stored in the data storage module 250 by viewing a GUI on the user display 220. The GUI may display information concerning the various digital data streams (e.g. 610*b*, 610*d* and 610*f*). Non-limiting examples of the indexed information may include a song title, the content identifier 610*b*, a time-to-play, a file size and a subject matter description (i.e. a song). However, the actual information displayed is a design choice and may depend on customer demand or merely reflect whatever information that that accompanies the digital data stream. All or parts of a information digital data stream 610 in the process of being received may also appear in the GUI display.

The presentation of the GUI index and is a design choice. The index may be displayed in any manner or format that may be desired. As non-limiting examples the index may be a list, an expandable folder tree or a series of drop down boxes.

At the decision point 902, the user also decides that they wish to purchase the license to the entire concert which may be digital data stream 610*a-f* or to an individual song (e.g. 610*d*). The digital data stream 610*a-f* may be comprised of its content identifier 610*a* and component digital data streams 610*b*, 610*d* and 610*f* and their respective content identifiers 610*a*, 610*c*, 610*e* which may be associated with songs 1, 2 and 3. Content identifier 610*a* may contain information associated with immediately succeeding song 1 as well as containing information concerning the all of the data in respect to songs 1-3 as a whole. Thereby, the listener may select a digital data stream from the index associated with a single song or that is associated with the entire concert.

To purchase the license, the listener may manipulate the transducer 225 to initiate instructions recorded within memory module 240 at process 910. The transducer 225 may be a physical device such as a push button or a toggle switch. The type of physical transducer 225 is a design choice and may be any type of physical transducer. The listener may select the desired digital data stream in the index and then manipulate the purchase transducer 225.

In an alternative embodiment, the transducer 225 may be an electronic object rendered on the GUI that may be manipulated by the listener. Such an object may be an electronic button, a radio button, an Icon or some other object. The manifestation of the object is a design choice.

In another embodiment, the transducer 225 may also be a microphone whereby a spoken command is received and converted to a computer readable command via voice recognition software which is well known by those of ordinary skill in the art. The voice recognition software may be stored in memory module 240 or run as executed commands in the processor 230.

Upon the manipulation of the transducer 225, the processor 230 may retrieve the content identifier 610*a* from the storage module 250 at process 920 and may retrieve at least the user ID 612 associated with the listener from the user profile 245 at process 930. If there is purchase data 613 available in the user profile 245, then that information may be retrieved as well.

At process 940, the content identifier 610*a*, the user ID 612 and any purchase information 613 may be integrated into a purchase request message, such as the purchase request message 611, at process 940. Means for compiling a message that are well known in the art are not being discussed herein. The addressees for the purchase request message 611 may be retrieved from the content identifier 610*a* or may be retrieved from storage elsewhere such as memory module 240, as may be the case.

Once integrated, the purchase request message 611 may be transmitted to the transaction agent 500 where the purchase request message is received, read and parsed, at process 950. The licensing transaction may be completed using the purchase information 613. After the transaction is completed, a purchase acknowledgement message may be returned to and received at the digital radio 200 at process 960. The purchase acknowledgment message 620 may be returned by the same routing as the purchase message was sent. The purchase acknowledgment message 620 may be returned by a different route from that which the purchase message was sent. The purchase acknowledgement message 620 may take the form as may be found to be convenient by a system designer. Non-limiting examples of purchase acknowledgement message 620 protocols include an e-mail, a Short Message Service (SMS) message, a text message, an instant message (IM). Further, the purchase request message 620 may be sent to a destination device other than the digital radio. Non-limiting examples may include the user's cell phone 300, the user's personal computer (not shown) or other deceive 101 such as an MP3 player. The return address for the desired device may be included within the purchase information 613 and may be selectable from the user display interface 220 of the digital radio. Such a selection may be made by incorporating a second transducer (not shown) specifically programmed to send the acknowledgement message 620 to the other device or the address may be selected from a list displayed at the user display/interface 220

In an embodiment, the purchase acknowledgement message 620 may take the form of an e-mail that may be sent to an e-mail address included within the purchase information 613. The purchase acknowledgement message 620 may also include the purchased digital data stream/sound file 610 as an attachment along with the associated DMR key 622, as may be known in the art. Although the details of creating and executing DMR security protocols is beyond the scope of this disclosure, it would be recognized by one of ordinary skill in the art that the DMR key 622 would control where and how many times the digital data stream may be played, reproduced or transferred.

The purchase acknowledge message 620 (FIG. 6C) may be transmitted by any desirable method. Non-limiting examples may include broadcast, multicast or unicast methodologies that may be known in the art.

The purchase acknowledgement message may include the DMR key. Upon receipt of the purchase acknowledgement message 620, the DMR key 622 may be applied in process 970 to any DMR code within the digital radio 200 that may be preventing the reproduction and/or transfer of the subject digital data stream 610*a* to a device, such as the device 100 outside of the digital radio 200. Once released at process 980, the desired digital data stream 610*b* may be transferred at process 990 to another computing device 101 via the wireless communication module 235 or via wired connection port 260. The DMR key 622 may be communicated along with the digital data stream 610 in order to allow a particular number of authorized transfers or otherwise control dissemination.

Figure 7:
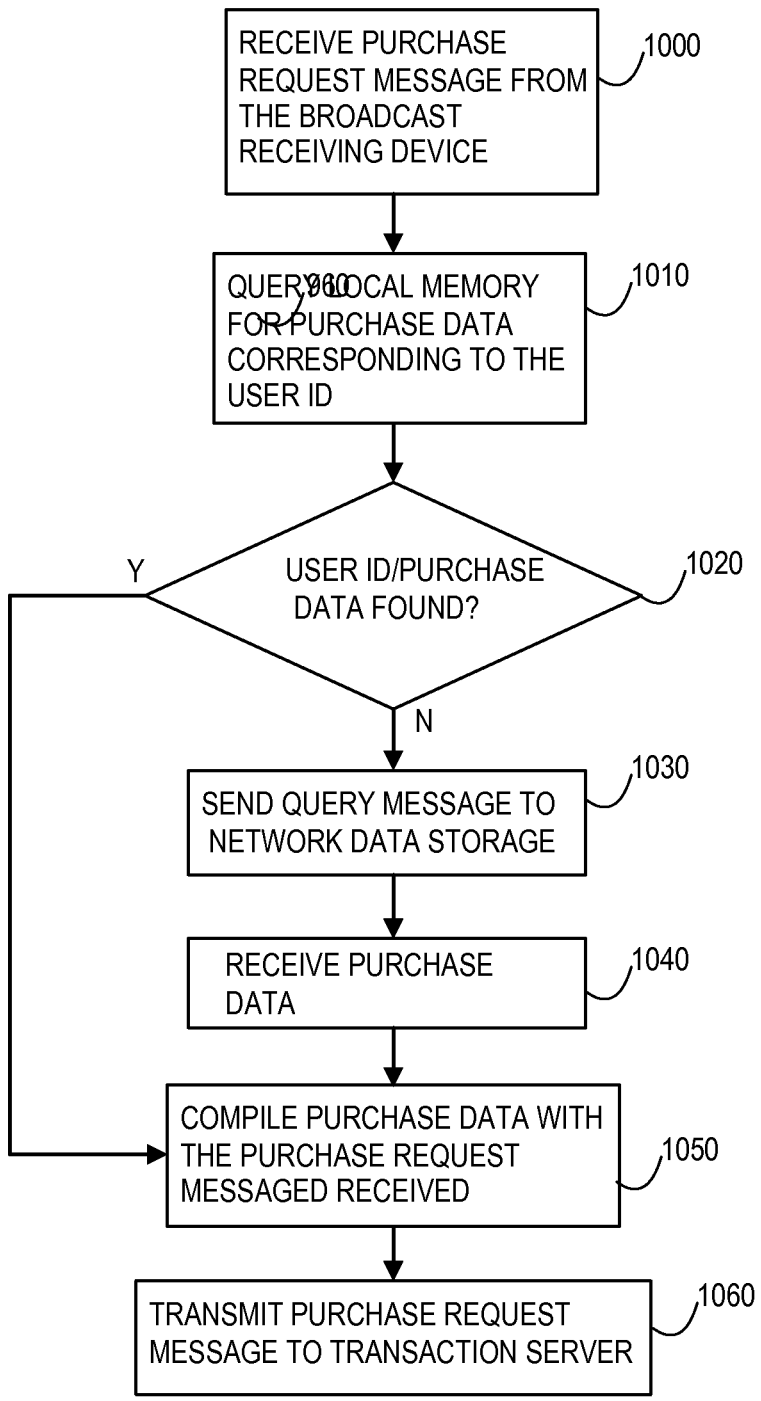
FIG. 7 is an exemplary flow diagram depicting the processes performed within an exemplary personal communication device consistent with the disclosure herein.

FIG. 7 is a flow diagram of a method by which an intermediary network device such as the cell phone 300 may be used to facilitate the remote purchase of a copyright. At process 1000, the cell phone 300 receives the purchase request message 611 from the broadcast receiving device 200. At process 1010 the cellular phone 300 may query its local memory 360 for a user profile, such as the user profile 367, that may correspond to a user ID, such as the user ID 612, embedded in the purchase request message 611. The user profile 367 may contain the purchase information 613. If the user profile 367 is located and contains purchase data at process 1020, the processor 310 retrieves the purchase data 613 and integrates the purchase data into the purchase request message 611 at process 1050.

If the purchase data 613 is not found, then the cell phone processor 310 may transmit a query to the network 800/700 for the information that may reside in the intermediary storage device 400 at process 1030. When a reply to the query is received with the purchase data 613 associated with the user ID 612 at process 1040, the purchase data is then integrated into the purchase request message 611 at process 1050. The purchase request message 611 is then sent to the transaction server 500 via the cellular system 800 and/or network 700 at process 1060. The transaction server 500 may return the purchase acknowledgement message 620 by the same routing over which the purchase request message 611 was received. In other embodiments the transaction server may return the acknowledgement message 620 by a different route via network 700 and/or cellular system 800.

If the purchase information is not found at the network storage device 400 or the user ID 612 fails to match either the user profile 367 in the cell phone 300 or any of the user profiles 435 in the network storage device(s) 400, the system may return an error message to the digital radio 200.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method, for facilitating user access to digital management rights to a digital data stream using a mobile communication device comprising a tangible user interface, a transceiver, a transducer, and a processor, the method comprising:

provinding the transducer being linked to executable code that, when executed by the processor, cause the processor to instruct a second communication device to request purchase of the digital management rights;

receiving user input by way of the transducer; transmitting, by the mobile communication device using the transceiver and the processor, in response to the user input, a purchase-triggering message to a second communication device, wherein the second communication device comprises a second user interface by which at least a portion of the digital data stream is presented to the user prior to receipt of the user input;

receiving, by the mobile communication device using the transceiver and processor, from the second communication device, in response to transmitting the purchase-triggering message, a purchase request message sent by the second communication device in response to the purchase-triggering message and including a user identification and a content identifier associated with the digital data stream presented to the user by the second communication device; and transmitting, by the mobile communication device using the transceiver and the processor, the purchase request message to a transaction server.

2. The method of claim 1, further comprising:
receiving, by the transceiver and the processor, from the transaction server, a purchase confirmation message comprising a digital rights management key associated with the digital data stream; and
transmitting, by the transceiver and the processor, the purchase confirmation message comprising the digital rights management key to the second communication device.

3. The method of claim 1, further comprising dialing, automatically, by the mobile communication device using a processor, a telephone number, embedded in the content identifier of the purchase request message received from the second communication device, to contact the transaction server for transmitting the purchase request message.

4. The method of claim 1, wherein the purchase request message transmitted by the mobile communication device includes purchase information comprising an address to which to deliver the digital data stream.

5. The method of claim 1, wherein:
the user input is first user input; and
the method further comprises:
receiving, by way of the user interface of the mobile communication device and using the processor, second user input indicating a selection from the list, the selection indicating the digital data stream; and
transmitting, by the mobile communication device using the transceiver and the processor, a selection message indicating the selection made by the second user input.

6. The method of claim 1, wherein the transducer of the mobile communication device includes one of a mechanical button and a mechanical switch.

7. The method of claim 1, wherein the user interface of the mobile communication device includes a keypad.

8. The method of claim 1, further comprising:
receiving, by the processor and the transceiver, a purchase confirmation message comprising a digital rights management key associated with the digital data stream;
determining, by the processor of the mobile communication device, in response to receiving the purchase confirmation message, to display a user notification indicative of a purchase confirmation; and
displaying, by way of the user interface of the mobile communication device and using the processor, the notification indicative of the purchase confirmation.

9. The method of claim 1, wherein:
the purchase request message comprises a query message querying for purchase information associated with the user identification;
the method further comprises:
determining, by the mobile communication device using the processor, whether a computer-readable storage device of the mobile communication device contains the purchase information;
transmitting, by the mobile communication device using the transceiver and the processor, to a system in response to determining that the computer-readable storage device does not contain the purchase information, the query message querying for purchase information associated with the user identification; and
receiving the purchase information by the transceiver and the processor, from the system, and in response to transmitting the query message using the transceiver; and
transmitting the purchase request message to the transaction server comprises transmitting the purchase request message having integrated therein the purchase information to the transaction server.

10. A mobile communications device, for facilitating user access to digital management rights to a digital data stream, comprising:
a tangible user interface comprising a transducer and being configured to receive user input and provide user communications;
a transceiver configured to send and receive communication signals to and from other devices;
a processor; and
a computer-readable storage device comprising computer-executable code that, when executed by the processor, cause the processor to perform operations comprising:
receiving user input by way of the transducer, the transducer being linked with instructions of the code to cause the processor to instruct a second communication device to request purchase of the digital management rights;
transmitting, by way of the transceiver, in response to the user input, a purchase-triggering message to a second communication device, wherein the second communication device comprises a second user interface by which at least a portion of the digital stream is presented to the user prior to receipt of the user input;
receiving, by way of the transceiver, from the second communication device, in response to transmitting the purchase-triggering message, a purchase request message being sent by the second communication device in response to the purchase-triggering message and comprising a user identification associated with a user of the mobile communication device and a content identifier associated with the digital data stream presented to the user by the second communication device; and
transmitting, using the transceiver, the purchase request message to a transaction server.

11. The system of claim 10, wherein the operations further comprise:
receiving, by way of the transceiver, a purchase confirmation message comprising a digital rights management key associated with the digital data stream;

determining, by the processor, in response to receiving the purchase confirmation message, to display a user notification indicative of a purchase confirmation; and displaying, by way of the user interface, the notification indicative of the purchase confirmation.

12. The system of claim 10, wherein operations further comprise:

receiving, by way of the transceiver, from the transaction server, a purchase confirmation message comprising a digital rights management key associated with the digital data stream; and transmitting the purchase confirmation message comprising the digital rights management key to the second communication device.

13. The system of claim 10, wherein the operations further comprise dialing, automatically, a telephone number embedded in the content identifier of the purchase request message received from the second communication device to contact the transaction server for transmitting the purchase request message.

14. The system of claim 10, wherein:

the user input is first user input; and the operations further comprise:

receiving, by way of the user interface, second user input indicating a selection from the list, the selection indicating the digital media stream; and transmitting, by way of the transceiver, a selection message indicating the selection made by the second user input.

15. The system of claim 10, wherein the transducer of the mobile communication device includes one of a mechanical button and a mechanical switch.

16. The system of claim 10, wherein the user interface of the mobile communication device includes a keypad.

17. The system of claim 10, wherein the purchase request message transmitted by the mobile communication device includes purchase information comprising an address to which to deliver the digital data stream.

18. A computer-readable storage device comprising computer-executable code that, when executed by a processor, cause the processor to perform operations, for facilitating user access to digital management rights to a digital data stream using a mobile communication device comprising a tangible user interface, a transceiver, a transducer, and the processor, the operations comprising:

receiving user input by way of the transducer, the transducer being linked with instructions of the code to cause the processor to instruct a second communication device to request purchase of the digital management rights;

transmitting, by way of the transceiver, in response to the user input, a purchase-triggering message to a second communication device, wherein the second communication device comprises a second user interface by which at least a portion of the digital data stream is presented to the user prior to receipt of the user input;

receiving, by way of the transceiver, from the second communication device, in response to transmitting the purchase-triggering message, a purchase request message being sent by the second communication device in response to the purchase-triggering message and comprising a user identification associated with a user of the mobile communication device and a content identifier associate with the digital data stream presented to the user by the second communication device; and transmitting, using the transceiver, the purchase request message having integrated therein the purchase information, to a transaction server.

19. The computer-readable storage device of claim 18, wherein the operations further comprise:

receiving, by way of the transceiver, a purchase confirmation message comprising a digital rights management key associated with the digital data stream;

determining, in response to receiving the purchase confirmation message, to display a user notification indicative of a purchase confirmation; and displaying, by way of the user interface, the notification indicative of the purchase confirmation.

20. The computer-readable storage device of claim 18, wherein the transducer of the mobile communication device includes one of a mechanical button and a mechanical switch.

* * * * *

UNITED STATES PATENT AND TRADEMARK OFFICE
CERTIFICATE OF CORRECTION

| | | |
|---|---|---|
| PATENT NO. | : 9,076,145 B2 | Page 1 of 1 |
| APPLICATION NO. | : 12/265732 | |
| DATED | : July 7, 2015 | |
| INVENTOR(S) | : Charles Stahulak et al. | |

It is certified that error appears in the above-identified patent and that said Letters Patent is hereby corrected as shown below:

Title Page, Item (75) Inventors, second inventor last name, Change "Bames" to --Barnes--

Signed and Sealed this
Twenty-ninth Day of December, 2015

Michelle K. Lee
*Director of the United States Patent and Trademark Office*